US006757720B1

(12) United States Patent
Weschler, Jr.

(10) Patent No.: US 6,757,720 B1
(45) Date of Patent: Jun. 29, 2004

(54) PROFILE SERVICE ARCHITECTURE

(75) Inventor: Paul William Weschler, Jr., Broomfield, CO (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/315,220

(22) Filed: May 19, 1999

(51) Int. Cl.$^7$ .................. G06F 15/16; G06F 15/177; G06F 9/00; G06F 17/30; G06F 9/44

(52) U.S. Cl. .................. 709/220; 709/203; 709/208; 709/227; 709/331; 707/10; 717/162

(58) Field of Search ................. 709/100, 108, 709/201, 203, 208–211, 213, 216–222, 227, 228, 313, 316, 318, 320, 328, 331; 707/10, 100; 713/200–202; 717/162, 165, 168, 170–173

(56) References Cited

U.S. PATENT DOCUMENTS

| | | | |
|---|---|---|---|
| 5,506,984 A | 4/1996 | Miller | 395/600 |
| 5,832,506 A | 11/1998 | Kuzma | |
| 5,974,547 A * | 10/1999 | Klimenko | 713/2 |
| 6,009,274 A * | 12/1999 | Fletcher et al. | 717/173 |
| 6,016,499 A * | 1/2000 | Ferguson | 707/104.1 |
| 6,066,182 A * | 5/2000 | Wilde et al. | 717/175 |
| 6,161,176 A * | 12/2000 | Hunter et al. | 713/1 |
| 6,167,449 A * | 12/2000 | Arnold et al. | 709/227 |
| 6,199,081 B1 * | 3/2001 | Meyerzon et al. | 715/513 |
| 6,317,826 B1 * | 11/2001 | McCall et al. | 713/1 |
| 6,343,287 B1 * | 1/2002 | Kumar et al. | 707/4 |
| 6,345,294 B1 * | 2/2002 | O'Toole et al. | 709/222 |
| 6,345,300 B1 * | 2/2002 | Bakshi et al. | 709/229 |
| 6,442,620 B1 * | 8/2002 | Thatte et al. | 709/316 |
| 6,457,066 B1 * | 9/2002 | Mein et al. | 709/330 |

FOREIGN PATENT DOCUMENTS

EP  0 675 451 A2  10/1995

OTHER PUBLICATIONS

Geonka, Vishal. "Complex Directory Lookup using Java Based LDAP Query extension" Internet Draft (IETF) Jan. 6, 1999.*
RFC 2251 Lightweight Directory Access Protocol (v3), by M. Wahl et al., Dec. 1997 (Internet Engineering Task Force).
RFC 2589 "Lightweight Directory Access Protocol (v3) Extensions for Dynamic Directory Services" By Y. Yaacovi et al., May 1999 (Internet Engineering Task Force).
Chamberlin, Don, A Complete Guide to DB2 Universal Database, 1998, pp. 8, 10, 13, 219, 221, 272, 359, 361, 363, 365, 462, and 619.
Developing DataBlade® Modules for INFORMIX®—Universal Server, 2000, pp. 1–8.

* cited by examiner

*Primary Examiner*—Rupal Dharia
*Assistant Examiner*—Melvin H. Pollack
(74) *Attorney, Agent, or Firm*—Kent A. Lembke; William J. Kubida; Hogan & Hartson LLP

(57) ABSTRACT

A mechanism for managing a plurality of profile data structures where each profile data structure comprising a hierarchical structure of attributes. The mechanism includes a core profile service engine having a number of predefined built-in functions. A first pluggable interface within the core profile service supports runtime binding to remote protocol adapterso. A second pluggable interface within the core profiling service supports runtime binding to external datastore plug-ins. A third pluggable interface within the core profiling service supports runtime binding to external service plug-ins where the external service plug-ins provide functions for manipulating profile data structures in addition to built in functions provided by the core profile service.

33 Claims, 5 Drawing Sheets

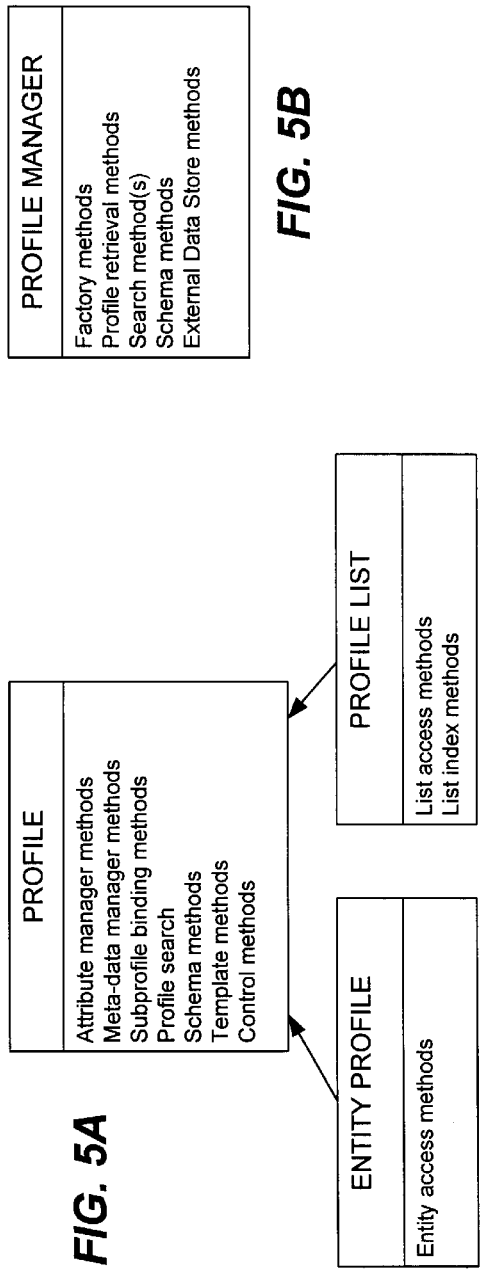
FIG. 5A
FIG. 5B
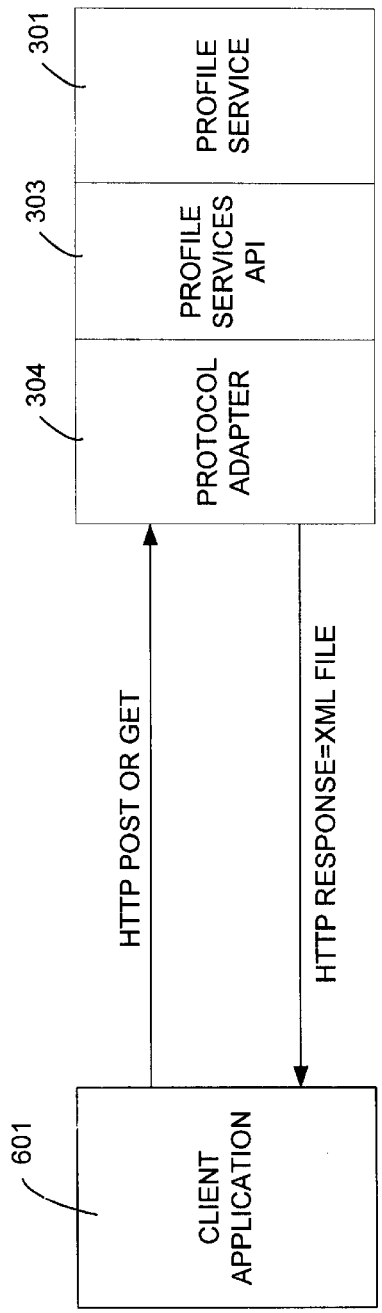
FIG. 6

PROFILE SERVICE ARCHITECTURE

BACKGROUND OF THE INVENTION

1. Field of the Invention

The present invention relates, in general, to enterprise computing systems and methods, and, more particularly, to a method and system that provides a high performance interface to integrate, store, retrieve and manage reference information about entities.

2. Relevant Background

Computer systems including business systems, entertainment systems, and personal communication systems are increasingly implemented as distributed software systems. These systems are alternatively referred to as "enterprise networks" and "enterprise computing systems". These systems include application code and data that are distributed among a variety of data structures, data processor systems, storage devices and physical locations. They are intended to serve a geographically diverse and mobile set of users. This environment is complicated because system users move about the distributed system, using different software applications to access and process data, different hardware to perform their work, and often different physical locations to work from. These trends create a difficult problem in providing a secure yet consistent environment for the users.

In general, distributed computing systems must scale well. This means that the system architecture desirably adapts to more users, more applications, more data, and more geographical distribution of the users, applications, and data. The cost in money and time to switch over a network architecture that is adapted to a smaller business to one suited for a larger business is often prohibitive.

A conventional computing system uses a client/server model implemented on a local area network (LAN). In such systems powerful server computers (e.g., application servers and file servers) are used to process and access data. The requested data is then transmitted to the client computer for further processing. To scale to larger networks, multiple LANs may be internetworked using, for example, leased data lines to create a wide area network (WAN). The equipment required to implement a WAN is expensive and difficult to administer. Also, as networks become larger to include multiple LANs and multiple servers on each LAN it becomes increasingly difficult to find resources (i.e., files, applications, and users) on any one of the LANs.

As computing power continues to become less expensive, clients tend to process and store their own data, using the server primarily as a file server for sharing data with other client computers. Each software application running on the client, or the client's operating system (OS) may save client-specific configuration data that is used by the client to fine-tune and define the user's software environment at runtime.

As used herein, the term "profile information" refers to any information or meta-data used by a particular piece of hardware, software, or operating system to configure, initialize, shutdown and aide in making runtime processing decisions. The profile information may be associated with a particular application or group of applications, a particular hardware device or group of devices, as well as a particular user or group of users. Some operating systems store user profile information that is used during boot operations at application startup to tailor a limited number of the system characteristics to a particular machine user. However, this profile information is closely tied to a single machine and operating system. As a result, the profile information is not useful to a new user the first time that user logs onto a particular machine. Moreover, this information is not available to remote users that are accessing the LAN/WAN using remote access mechanisms.

Existing mechanisms tend to focus on a single type of profile information, user information or application information or hardware information. Also, because these mechanisms are very application specific they limit the number and type of attributes that can be retained. Further, the profile information is isolated and fails to indicate any hierarchical or relational order to the attributes. For example, it may be desirable that a user group is required to store all files created using a particular application suite to a specific file server. Existing systems, if such a service is available at all, must duplicate profile information in each application program merely to implement the required file storage location preference. Storage location direction based on a user-by-user or user group basis is difficult to implement and may in fact require a shell application running on top of the application suite. Even then, the system is not extensible to access, retrieve, and use profile information for a new user that has not used a particular machine before.

As in the example above, existing systems for storing configuration information lead to duplicative information stored in many locations. Each application stores a copy of its own configuration information, as does each hardware device and each user. Much of this information is identical. It is difficult to maintain consistency among these many copies in a distributed computing environment. For example, when the specified file storage location changes, each copy of the configuration information must be changed. The user or system administrator must manually track the location and content of each configuration file. An example of the inefficiencies of these types of systems is found in the Windows 95 registry file that holds profile information but has an acknowledged tendency to bloat over time with duplicative and unused data. Moreover, the registry file in such systems is so closely tied to a particular machine and instance of an operating system that it cannot be remotely accessed and used to configure other computers or devices. Hence, these systems are not generally extensible to manage multiple types of profile information using a single mechanism. A need exists for profile information that is readily accessible to all machines coupled to a network and to machines accessing the network through remote access mechanisms.

Another complicating influence is that networks are becoming increasingly heterogeneous on many fronts. Network users, software, hardware, and geographic boundaries are continuously changing and becoming more varied. For example, a single computer may have multiple users, each of which work more efficiently if the computer is configured to meet their needs. Conversely, a single user may access a network using multiple devices such as a workstation, a mobile computer, a handheld computer, or a data appliance such as a cellular phone or the like. A user may, for example, use a full featured email application to access email while working from a workstation but prefer a more compact application to access the same data when using a handheld computer or cellular phone. In each case, the network desirably adapts to the changed conditions with minimal user intervention.

There is increasing interest in remote access systems that enable a user to access a LAN/WAN using a public, generally insecure, communication channels such as the Internet.

Further, there is interest in enabling LANs to be internetworked using public communication channels. This is desirable because the network administrator can provide a single high speed gateway to the Internet rather than a remote server/modem combination for each user and expensive WAN communication lines. The Internet gateway can use leased lines to access the Internet rather than more costly business phone lines. Also, the Internet gateway can be shared among a variety of applications and so the cost is not dedicated solely to providing remote access or wide area networking. The reduction in hardware cost and recurrent phone line charges would be significant if remote users could access the LAN/WAN in this manner.

From a network user's perspective these limitations boil down to a need to manually configure a given computer to provide the user's desired computing environment. From a remote user's perspective these limitations require the user to manually reconfigure the remote access computer to mimic the desired computing environment or tolerate the generic environment provided by default by the remote access server. From a network administrator's perspective, these complications require software and operating systems to be custom configured upon installation to provide the desired computing environment. In each case, the time and effort consumed simply to get "up and running" is a significant impediment to efficient use of the distributed computing environment. What is needed is a system that readily adapts to the changing, heterogeneous needs of a distributed network computing environment.

One solution to the problem of finding resources in a distributed system is to use directories. Directories are data structures that hold information such as mail address book information, printer locations, public key infrastructure (PKI) information, and the like. Because of the range of functions and different needs of driving applications, most organizations end up with many different, disparate directories. These directories do not interact with each other and so contain duplicative information and are difficult to consistently maintain.

Directory software tends to be special purpose to serve the needs of a defined set of users to access information about and stored in a defined set of datastore mechanisms. For example, a DOS file system (i.e., a directory of filename-:physical location information) is written to be accessible only by a particular operating system (e.g., DOS, Windows, Unix, and the like). Hence, the file system information is not accessible to computers running other operating systems. Similarly, a file system cannot be amended to serve as a directory for other types of devices (e.g., an email directory). Moreover, the functionality of a file system is rigidly fixed and is not readily extended to provide new functionality such as authentication, replication, file system logging, and the like. These types of changes require rewrite and recompile of the file system software. A need exists for a directory system that is flexible and adaptable to service a variety of user entities, store directory information about a variety of objects, and incorporate a variety of functionality at runtime.

Meta-directories are a partial solution that provide a directory integration to unify and centrally manage disparate directories within an enterprise. However, existing solutions are not sufficiently extensible to account for the wide variety and continuously changing set of resources for which directory information is desirable. In the past, metadirectory technology has not been used to catalog meta-data of sufficiently general nature to meet the needs of a dynamically growing and changing distributed computing environment. Also, meta-directory software continues to have the disadvantages of being written to support a specific, narrow set of users working on software/hardware platforms in a manner that provides a defined, non-extensible set of functionality. What is needed in a service architecture that provides directory integration together with extensible user interfaces and functionality.

SUMMARY OF THE INVENTION

Briefly stated, the present invention involves a mechanism, method, and computer program product for managing a plurality of profile data structures where each profile data structure comprising a hierarchical structure of attributes. The mechanism includes a core profile service engine having a number of predefined built-in functions. A first pluggable interface within the core profile service supports runtime binding to remote protocol adapters. A second pluggable interface within the core profiling service supports runtime binding to external datastore plug-ins. A third pluggable interface within the core profiling service supports runtime binding to external service plug-ins where the external service plug-ins provide functions for manipulating profile data structures in addition to built in functions provided by the core profile service.

BRIEF DESCRIPTION OF THE DRAWINGS

FIG. 5A and FIG. 5B show class structure and relationships between classes used in an exemplary embodiment of the present invention.

FIG. 6 shows an exemplary mechanism for accessing a built-in interface of a profile service instance in accordance with the present invention.

DETAILED DESCRIPTION OF THE PREFERRED EMBODIMENTS

Figure 1:
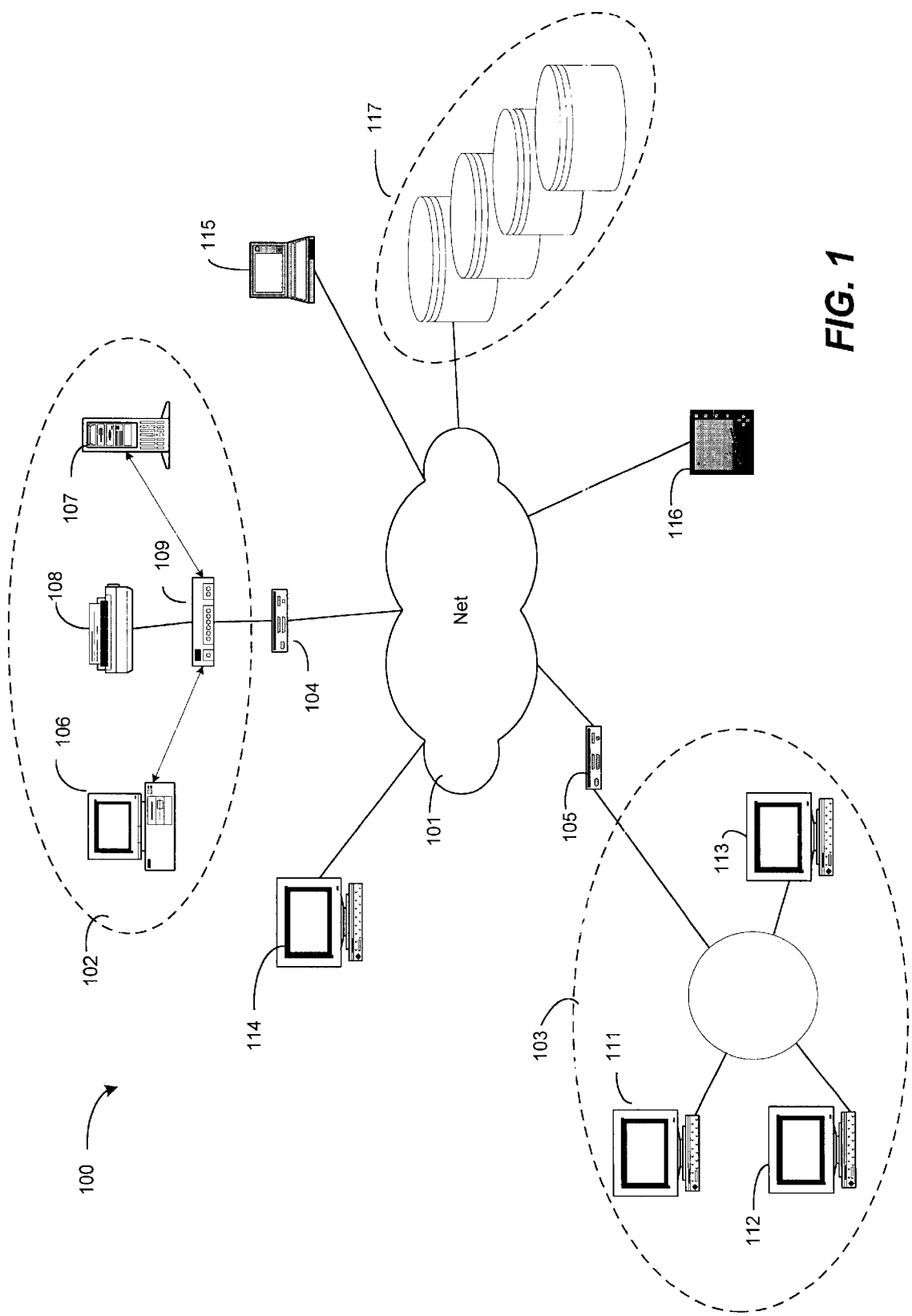
FIG. 1 illustrates an exemplary network computing environment in which the present invention is implemented.

The present invention involves an architecture for implementing a profile service. A profile service is a mechanism for storing and retrieving profile information, particularly in a distributed computing environment. Profile information refers to any information or meta-data used by a particular piece of hardware, software, or operating system to configure, initialize, shutdown and aide in making runtime processing decisions. The architecture in accordance with the present invention is described herein in terms of a layered model using industry standard components where appropriate to improve interoperability, platform independence, and to leverage existing experience.

In general, the present invention involves an architecture that employs a lightweight core profile engine (301 in FIG. 3) that provides multiple "pluggable" interfaces for runtime extensibility. The core profile engine provides essential functionality and may provide built-in (i.e., non-pluggable) interfaces as well to provide built-in functionality upon instantiation. Plug-in components are provided with the core profile engine or by third-party component manufacturers to implement functionality and program behavior that is not included in the built in "essential" functions.

The plug-in behavior is of three general types. First, plug-in protocol adapters manage communication with user entities such as people, software applications, and hardware devices that make access requests to obtain information from the profile system. Second, plug-in service provider interfaces implement access protocols for data storage mechanisms including naming and directory services for data storage mechanisms. Third, service module plug-ins attach at runtime to provide functionality and behavior that augments the program behavior implemented in the core profile service. In this manner, the core profile engine is readily extended to provide new functionality, using new hardware devices and network configurations to provide service to new types of clients.

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary the present invention is applicable to significantly larger, more complex network environments as well as small network environments such as conventional LAN systems.

It is contemplated that the present invention will be particularly useful in environments where dynamic runtime modification of core application functionality and behavior is required or desirable. Also, the system of the preferred implementation is optimized to store and make available relatively compact units of data that serve to configure devices and computer environments rather than operational or analytical data upon which the computer environment may operate at runtime. Hence, the present invention is best used when it stores and retrieves data that is frequently searched and retrieved, but infrequently changed.

To aid understanding several words and terms used herein to describe the present invention are defined below:

Attribute The combination of a key related to one or more values. Frequently described as a key=value pair.

Binding A special type of attribute where the value of the key=value pair is itself a Profile. Binding one Profile to another in a chained fashion it is possible build tree structures of related profiles and attribute information (called a profile tree).

Profile A collection of attributes related either directly or indirectly to a EntityProfile that represents some sort of entity such as a user.

EntityProfile A collection of attributes that establish the root of a profile tree and serve as the base representation of some entity. This is the core data object around which the entire Profile Service is designed to function. In an object oriented sense an EntityProfile extends a Profile to add special functions & behavior.

ProfileList A special type of Profile whose member attributes (with the exception of some system attributes) are themselves Profiles. In an object oriented sense a ProfileList extends a Profile to add special functions & behavior.

Profile Service The term generally used to refer to all of the functional interfaces of Profile Service. The term is frequently used to refer specifically to the core Profile Service interface.

Profile Service Interface The core functional interface of the Profile Service. This interface provides functions for creating, searching and removing profiles in addition to some administrative utilities.

Profile Interfaces A term used to collectively refer to the functional interfaces of Profile, EntityProfiles and ProfileLists. These interfaces provide functions for manipulating the composition of individual Profiles.

Resource ID An identifier that is constructed by the Profile Service to uniquely identify every constituent profile and attribute therein. Resource IDs have a well defined string structure.

Profile Type A special attribute of all Profiles. This attribute is mandatory for all profiles and plays an important role in generating resource IDs and data indexing.

Entity-Entity ID A special attribute of all EntityProfiles. This attribute plays an important role in generating resource IDs and data indexing. The Profile Service enforces the rule that all entity IDs are unique within the set of all EntityProfiles of the same type.

List Key A special attribute of all ProfileLists. This attribute plays an important role in generating resource IDs and data indexing. The Profile Service enforces the rule that all profiles bound to a ProfileList are bound to the key such that that the profileList.attKey=memberProfile.listKey.value. ProfileLists may only have one member Profile with a specific list key value.

List Members A term used to refer to the collection of Profiles bound to a ProfileList. Each bound profile is referred to as a member.

FIG. 1 shows an exemplary computing environment 100 in which the present invention may be implemented. Essentially, a number of computing devices and groups of devices are interconnected through a network 101. For example, a LAN 102 and a LAN 103 are each coupled to network 101 through gateway machines 104 and 105 respectively. LANs 102 and 103 may be implemented using any available topology such as a hub and spoke topology of LAN 102 and a loop topology of LAN 103. LANs 102 and 103 may implement one or more server technologies including, for example a UNIX, Novell, or Windows NT, or peer-to-peer type network. Each network will include distributed storage implemented in each device and typically includes some mass storage device coupled to or managed by a server computer. Network 101 comprises, for example, a public network such as the internet or another network mechanism such as a fibre channel fabric or conventional WAN technologies.

LAN 102 includes one or more workstations such as personal computer (PC) 106. LAN 102 also includes a server machine 107 and one or more shared devices such as printer 108. A hub or router 109 provides a physical connection between the various devices in LAN 102. Router 104 is coupled through gateway 109 to provide shared access to network 101. Gateway 109 may implement any desired access and security protocols to manage access between network 101 and devices coupled to network 102. Similarly, network 103 comprises a collection of workstations 111, 112 and 113 that share a common connection to network 101 through gateway 105.

Distributed computing environment 100 further includes a wide variety of devices that have a logical connection to the network supported by a physical connection to network 101. For example, a stand alone workstation 114 may couple to network 101 through a modem or other suitable physical connection. Likewise, notebook computer 115 and palmtop computer 116 may connect to network 101 using known connection technologies. It is contemplated that a wide variety of devices may join the distributed network 100 including mobile phones, remote telemetry devices, information appliances, and the like. An important feature of the present invention is that it tolerates and adapts to an environment filled with heterogeneous hardware devices coupled to the network 101 from a variety of physical locations.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm 116 that provides mass storage capacity beyond what an individual device can efficiently use and manage. Selected components of the present invention may be stored in or implemented in shared mass storage such as disk farm 116.

Figure 2:
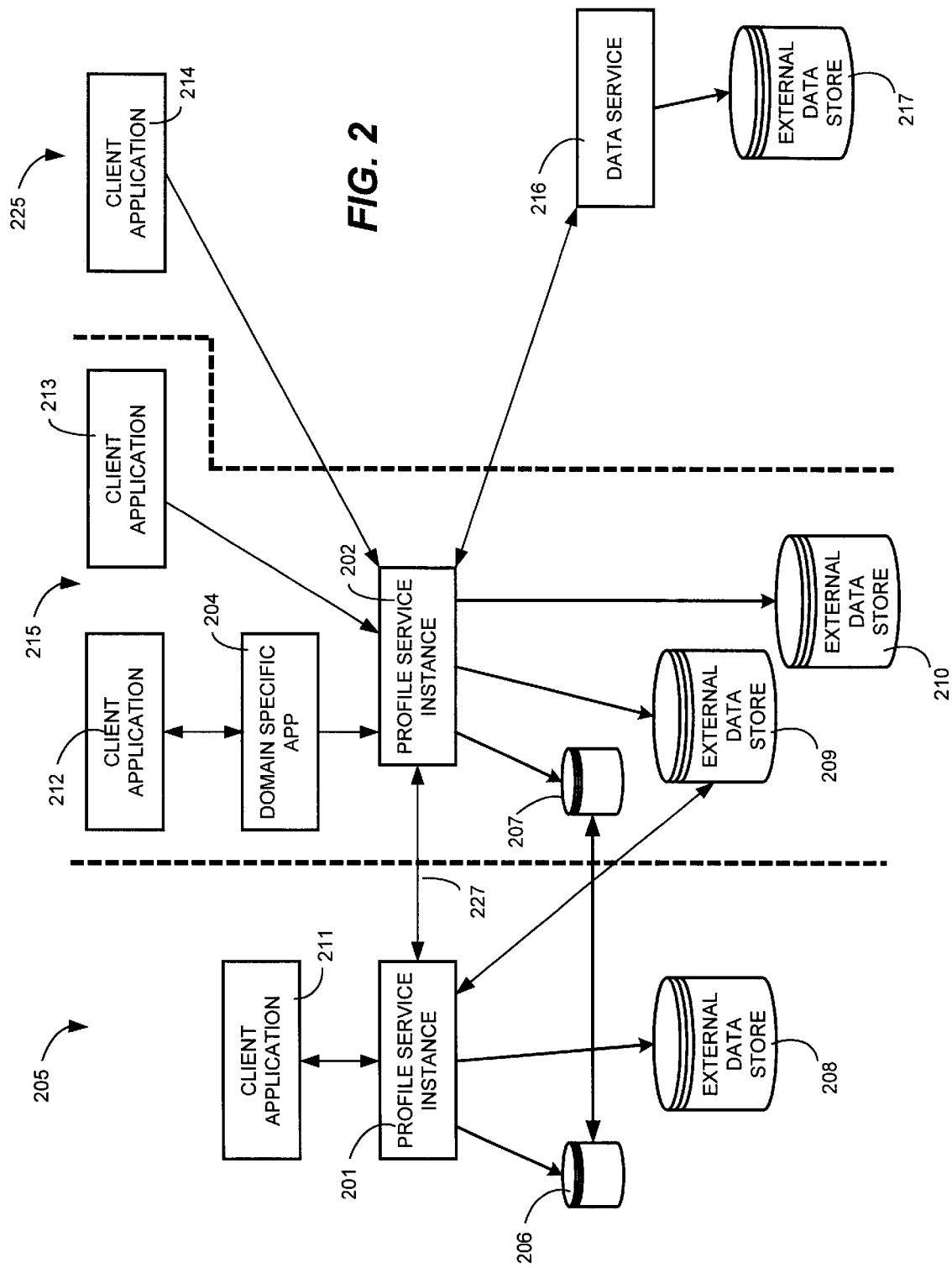
FIG. 2 shows a more specific network architecture in which in which the present invention is employed.

FIG. 2 shows a generalized diagram of the present invention implemented in a distributed computing environment including three geographic regions 205, 215 and 225. The bold dashed lines indicate geographic boundaries that separate the hardware upon which the various elements shown in FIG. 2 are implemented. Connections between components are indicated by lines with arrowheads and are typically bi-directional unless specifically indicated otherwise by this description. The connections represent physical and logical connections that may be implemented using any available communications protocols and data transport mechanisms including both public and private network facilities.

The environment of FIG. 2 includes two profile services instances 201 and 202. Each profile service instance is implemented in a separate geographic environment (e.g., a LAN or standalone environment) as suggested by the dashed vertical lines in FIG. 2. The local environments are coupled by an available WAN connection provided by, for example, a continuous connection, an on-demand connections, and/or multiplexed connections.

A client application 211 accesses the profile service instance 201 to request profile services. The profile service instance 201, performs the requested service using a virtual profile data store comprising dedicated datastore 206, local external datastore 208 and remote external datastore 209. Profile service instances 201 and 202 are associated with a dedicated data store 206 and 207 respectively. The dedicated data store is local to the associated profile service instance and is not used by other applications. Dedicated data store 206 and 207 may be implemented using any available persistent storage device such as a magnetic, optical, or magneto-optical disk, solid state memory, and the like. Dedicated datastore 206 and 207 may use only a portion of the physical storage device upon which they are implemented. For example, datastore 206 may be a single volume or file on a multi-volume storage device.

In an exemplary implementation, profile service instances include a build-in adapter for coupling to their associated dedicated datastore. The built-in adapter may be implemented using, for example, a lightweight directory access protocol (LDAP) that provides an industry standard directory access mechanism. Other directory access protocols including industry standardized and proprietary protocols may be equivalently substituted in particular applications. A feature of the present invention is that some or all of the contents of a dedicated data store are replicated across each dedicated datastore of each profile service instance in a given system. It is contemplated that not all of the data need be replicated as some profile data will be of a nature that will only be used in a given geographic area and replication may be wasteful. For example, if it is known that client application 214 never requests profile services through profile service instance 201, any profile information held in dedicated datastore 207 about client application 214 need not be replicated in dedicated datastore 206. The degree and manner of replication is determined to meet the needs of a particular application.

"User entities" such as client software and/or hardware use the profile service by establishing a runtime binding to a profile service instance. In FIG. 2, client applications 211, 212, 213 and 214 and application 204 represent user entities. Client application 212 is an indirect user of profile service instance 202 because it accesses through the domain-specific application 204. Domain specific application 204 is essentially an adapter or shell that provides accessibility when, for example, client application 212 is unable to communicate with an external service.

Each profile service instance 201 and 202 include one or more plug-in remote protocol adapters in addition to any built-in protocol adapters. Each remote protocol adapter implements a transport protocol supporting communication with a client 211–214) and a particular communications network used by the client. For example, remote protocol adapters may implement hypertext transfer protocol (HTTP) with embedded extensible markup language (XML) documents, HTTP with hypertext markup language (HTML) forms, remote method invocation (RMI), common object request broker (CORBA), and the like. It is contemplated that other transport mechanisms may be useful in particular applications such as transport mechanisms specified for fibre channel fabrics as well as proprietary transport protocols. The markup language document is used to encode commands and control information in a declarative fashion in a readily transportable fashion. Accordingly, any available encoding format that is readily transportable using the available transport mechanism (e.g., HTTP) is suitable. These and other implementations are considered equivalent to the specific embodiments disclosed herein unless specifically indicated otherwise.

Important functions of a protocol adapter include providing a data transport mechanism that is compatible with the associated client and with the physical communication link between the client and the profile service instance. Further, where the data transport mechanism requires, the protocol adapter must translate messages from and to the client application into a form that can be embedded in the data transport mechanism. In addition to plug-in protocol adapters, one or more protocol adapters may be built in to the profile service itself.

Each profile service instance 201 and 202 include plug-in interfaces for coupling to external datastore mechanisms. As shown in FIG. 2, profile service instance 201 couples to a local external datastore 208 and a remote external data store 209. In operation each profile service 201 and 202 make a runtime binding to an appropriate storage provider plug-in to make the necessary connections to store and retrieved data from the attached external storage device. External storage devices 208, 209, 210 and 217 may be accessed using any available storage access mechanisms including X.500, LDAP, Novell directory service (NDS), network file system (NFS), network information system (NIS), remote method invocation (RMI), common object request broker (CORBA) and the like. By providing an appropriate plug-in, new directory services that have not been defined when the core profile service is written can be integrated into the system in accordance with the present invention.

As illustrated by the instance in region 215, multiple client applications 212–214 may access a single profile service instance. Typically, a client application would attempt to access the profile service instance in the same geographic area, however, one may not be available as in the case of mobile users. Because the profile service instance can plug-in remote protocol adapters as needed to support a communication link, the client applications need not be using the same hardware or software platform, and may be using different data transport protocols to access profile service instance 202. Similarly, a single profile service instance can attach to a variety of heterogeneous datastore devices simultaneously.

As shown in geographic region 225, remote data service applications such as service 216 can also be attached using storage provider plug-ins. A data service application may be implement a comparatively simple operation such as a network file system or more complex such as a meta-directory, an on-line data service such as LEXIS or DIALOG commercial on-line data services, or an internet search engine.

As suggested by link 227, multiple profile service instances can be federated to establish a single logical profile data base by setting configuration parameters on the desired instance (e.g., instances 201 and 202 in FIG. 2). Collaboration is implemented utilizing a combination of profile and field level identifiers and request forwarding between instances of the profiling service over link 227. When two profile instances are linked, the profile information stored in the dedicated databases 206 and 207 become available to each of the instances. This creates a potential for conflict if a profile service attempting to access a profile or attribute within a profile cannot distinguish between two profiles or between two or more attributes of a profile.

In accordance with the present invention, each profile and each attribute is marked with a resource identifier. Previously unconnected profiling service instances can be connected with virtually no risk of data conflicts by leveraging the resource identifiers built-into the core profiling service.

Figure 3:
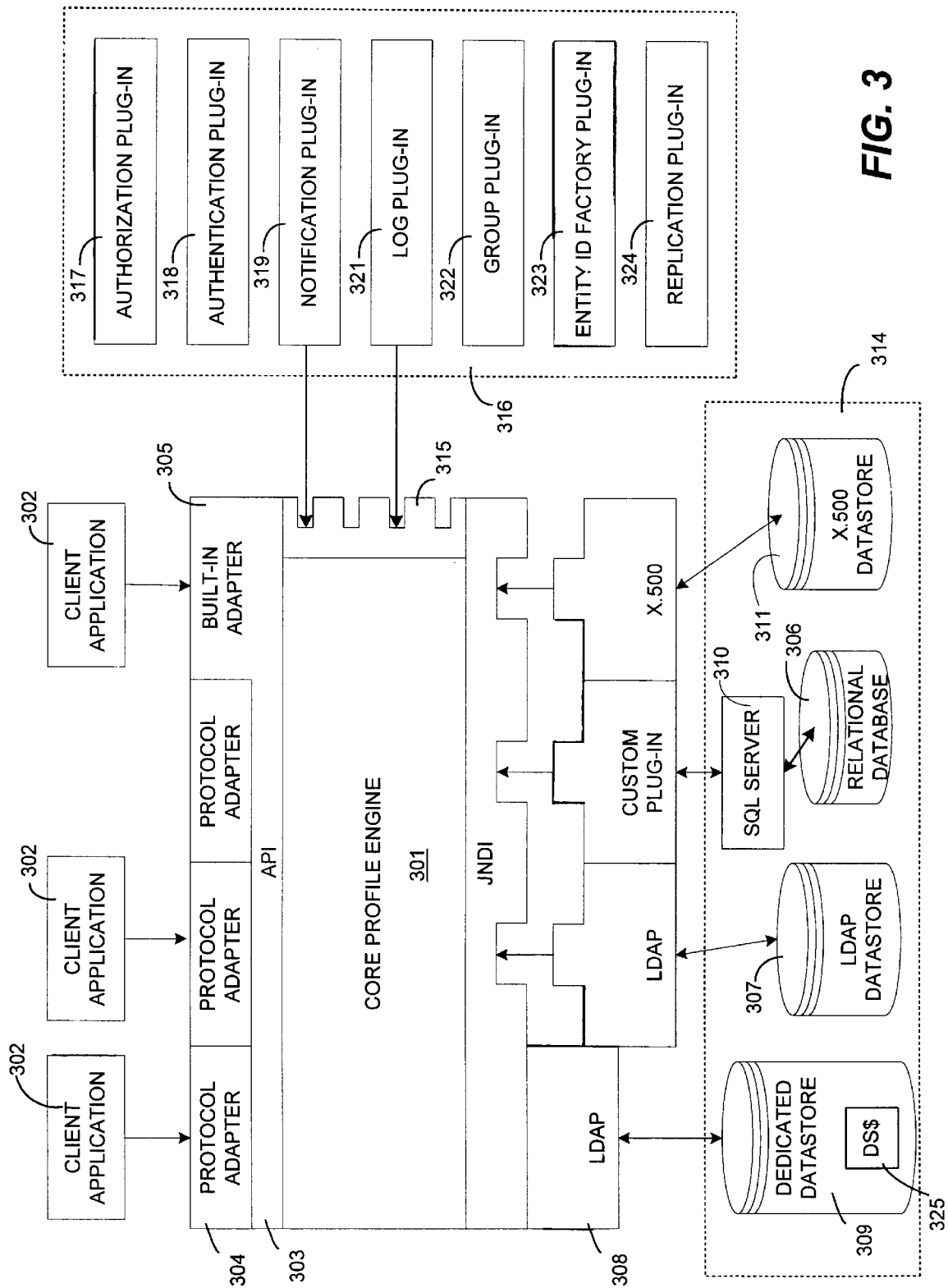
FIG. 3 shows in block diagram form significant components in a particular example of a profile service mechanism in accordance with the present invention.

FIG. 3 shows a more detailed example of an implementation of the present invention. The components include a core profile engine 301 that is accessed by a client application 302 through a profile services application programming interface (API) 303. API 303 implements within itself or attaches to one or more protocol adapters 304. Client applications 302 that have a corresponding interface to one of protocol adapters 304 send and receive messages through API 303 to core profile engine 301. The messages enable client application 302 to send data and commands to request profile services from core profile engine 301.

In a particular implementation the profile service API 303 includes a built in protocol adapter 305 to provide client accessibility without any plug-in adapters 304. In a particular embodiment, built-in adapter 305 implements a protocol based on extensible markup language documents embedded within hypertext transport protocol (HTTP) data packets. The XML documents have embedded elements that contain formatted versions of request and response messages communicated between client application(s) 302 and core profile engine 301. XML documents are a useful format because the language is well understood, actively developed, and readily transportable through a variety of communications media using commonly available HTTP transport mechanisms. Routers, switches, network ports, and other network devices recognize XML formatted documents embedded in HTTP data transport packets and are configured to handle them appropriately and reliably. It is contemplated that other formats and transport mechanisms may be used such as HTML or SGML format documents. Also, other transport mechanisms may be useful in particular applications such as transport mechanisms specified for fibre channel fabrics as well as proprietary transport protocols. These and other implementations are considered equivalent to the specific embodiments disclosed herein unless specifically indicated otherwise.

Core profile engine 301 responds to the client request messages by passing the message to an appropriate method to execute requested functions on virtual profile data store 314. Core profile engine 301 comprises a profile manager object and a plurality of profile objects that are described in greater detail with reference to FIG. 5A and FIG. 5B. Typically the core profile service will respond to a request message by accessing profile information from its dedicated datastore or an external datastore (shown in FIG. 2) and generating a response message. The response message is sent back through API 303 to the appropriate protocol adapter 304 (or built-in adapter 305) to the requesting client application 302.

In the implementation of FIG. 3, core profiling engine 301 includes a built-in interface for attaching to data storage devices. JAVA™ naming and directory interface™ (JNDI) is a commercially available naming and directory interface that includes a pluggable service provider interface (SPIs). JNDI is essentially an API that provides naming and directory functionality to applications written in a JAVA programming environment. JAVA and JAVA Naming and Directory Interface are trademarks or registered trademarks of Sun Microsystems. Inc. in the United States and other countries. JNDI is defined to be independent of any specific directory service implementation. Hence, a variety of directories including legacy, emerging, and already deployed directories can be accessed in a common manner. In operation core profile engine 301 causes JNDI to create a transparent runtime binding to naming and directory service such as an X.500 datastore 311 or LDAP datastore 307 as shown in FIG. 3.

It is contemplated that instead of or in addition to JNDI the present invention may also incorporate a built-in interface to support directory access to its associated dedicated datastore 309. Because dedicated datastore 309 is not accessed by other applications, a compiled, built-in interface may be more appropriate and efficient than a plug-in interface. In the example of FIG. 3, built-in LDAP module 308 is used to access dedicated datastore 309. However, the JNDI layer provides flexibility in the choice of the mechanism used to implement dedicated data store 309 as the LDAP module 308 is readily replaced by any of a wide variety of available modules.

Virtual profile data store 314 may comprise a single data storage device, but more often comprises a plurality of disparate, heterogeneous data storage devices. The specific example of FIG. 3 includes an LDAP datastore 307, X.500 datastore 311, and a relational database 306 accessed through a database application such as a structured query language (SQL) server 310. As noted above, virtual profile data store 314 may also include flat data file(s), object oriented database(s) and the like. Virtual data store 314 includes a dynamically changing number of data store devices as datastore mechanisms can be added, changed, modified and deleted by modifications to the associated adapter module.

The core profiling engine 301 includes another pluggable interface 315 for attaching to a group of optional pluggable service modules 316 including service modules 317–324, that provide supporting functionality and implement program behavior. The set of plug in service modules 316 are optional in that core profile engine 301 will run even if no plug-in modules are available. In a particular implementation, modules are plugged in by specifying an initialization parameter when the profile manager object within core profile service 301 is instantiated. Alternatively, the pluggable modules may be dynamically loaded at runtime. The initialization parameter comprises an address or fully qualified path pointing to a location at which the plug-in module is stored. The plug-in module need not be stored locally or in the same machine as the core profile engine 301. Upon instantiation, core profile engine 301 creates a runtime binding to the plug-in service module and thereafter the program behavior embodied in the plug-in module is available. While plug-in service modules will typically extend functionality of core profiling service 301, it is contemplated that in some applications a plug-in module may override or overload basic functionality and behavior implemented as built-in functions within core profile service 301. In this manner the core profiling engine can be customized and extended to meet the needs of a particular application.

Example plug-in service modules shown in FIG. 3 include authorization module 317 and authentication module 318 that implement authentication and authorization for a particular application. Some implementations may not need this service and so it may not be integrated into core profile engine 301. Also, the complexity of these features will vary significantly in response to the needs of a particular application. These modules combine with core profiling service 301 to provide enterprise level functionality and are fully optional.

A notification plug-in implements functionality that is responsible for executing trigger-specified notifications of external systems. It is contemplated that the notification engine plug-in may itself use a pluggable architecture to handle notification in different formats based on the destination of the notification. In general, when a profile record is updated other profiles may require or desire to be updated as well. For example, consider a case involving a human resources profile having attributes for a plurality of employees within the organization. An employee may change addresses or phone numbers and other profiles, such as an employee phone directory profile, may need that information. Notification may be lazy or immediate depending on the type of notification. An employee that has been terminated may require immediate notification to security and expense account profiles, for example.

Yet another example of a plug-in module is event logging module 321 that functions to record events that occur in the profiling service. File systems often are implemented with logging functions to enable the system to recreate transactions in the event of hardware failure. Logging module 321 is similar to such a logging function, however, is not limited to file-system type logging. Instead, any profile information or operation within profile service 201 (shown in FIG. 2) may be logged.

Group plug in 322 is used to define and manage group specifications in profile service 301. A group is an organizational entity that includes members that have shared attribute information by virtue of their membership. A group may be, for example, a workgroup or team within an organization, a suite of software applications, a group of hard disk drives that form a RAID storage set, and the like. The members of each group may share specified privileges or have specified restrictions imposed on them. In the particular example group services are not built into core profile service 301 because the types of groups and form of group management is expected to take exceptionally application-specific form. Accordingly, it is more efficient to add the group behaviors as special purpose plug-in modules rather than increase the bulk of the core profiling service. It should be understood that the group plug-in, as with any other plug-in, can be built into the core profiling service if desired with some expected increase in size and complexity of the core profiling service.

Another example of a plug-in module is enityIDFactory 323. As noted hereinbelow, the present invention supports a special type of entity profile referred to as an entity profile that has a unique ID associated with it. The unique ID enables the profile to be readily distinguished from all other profiles of the same type. While it is a simple task to assign unique Ids and that task could readily be built into core profile service 302, it has been found that users may wish to exert some control over the manner in which Ids are assigned. Accordingly, implementation of ID assignment by a plug-in module enables this task to be customized to satisfy user desires.

Replication plug-in 324 implements functionality required to replicate the contents of dedicated datastore 206 and 207 shown in FIG. 2. As noted hereinbefore, users may wish to customize the replication methodology by specifying only a portion of the dedicated database that is replicated. Moreover, user's may wish to specify the frequency and timing of replication events to balance the need for replication against the cost of transporting data between replicas. Replication plug-in provides this customizable functionality.

The profile service in accordance with the present invention provides a high-speed mechanism to lookup, structure and store key/value pairs stored in data structures called profiles. These key/value pairs represent information about "entities" such as application software, users, hardware devices, and the like. The present invention is preferably implemented as a service running on a gateway server. The present invention is intended to integrate several physical data stores into a single, distributed logical data store of reference information.

Figure 4:
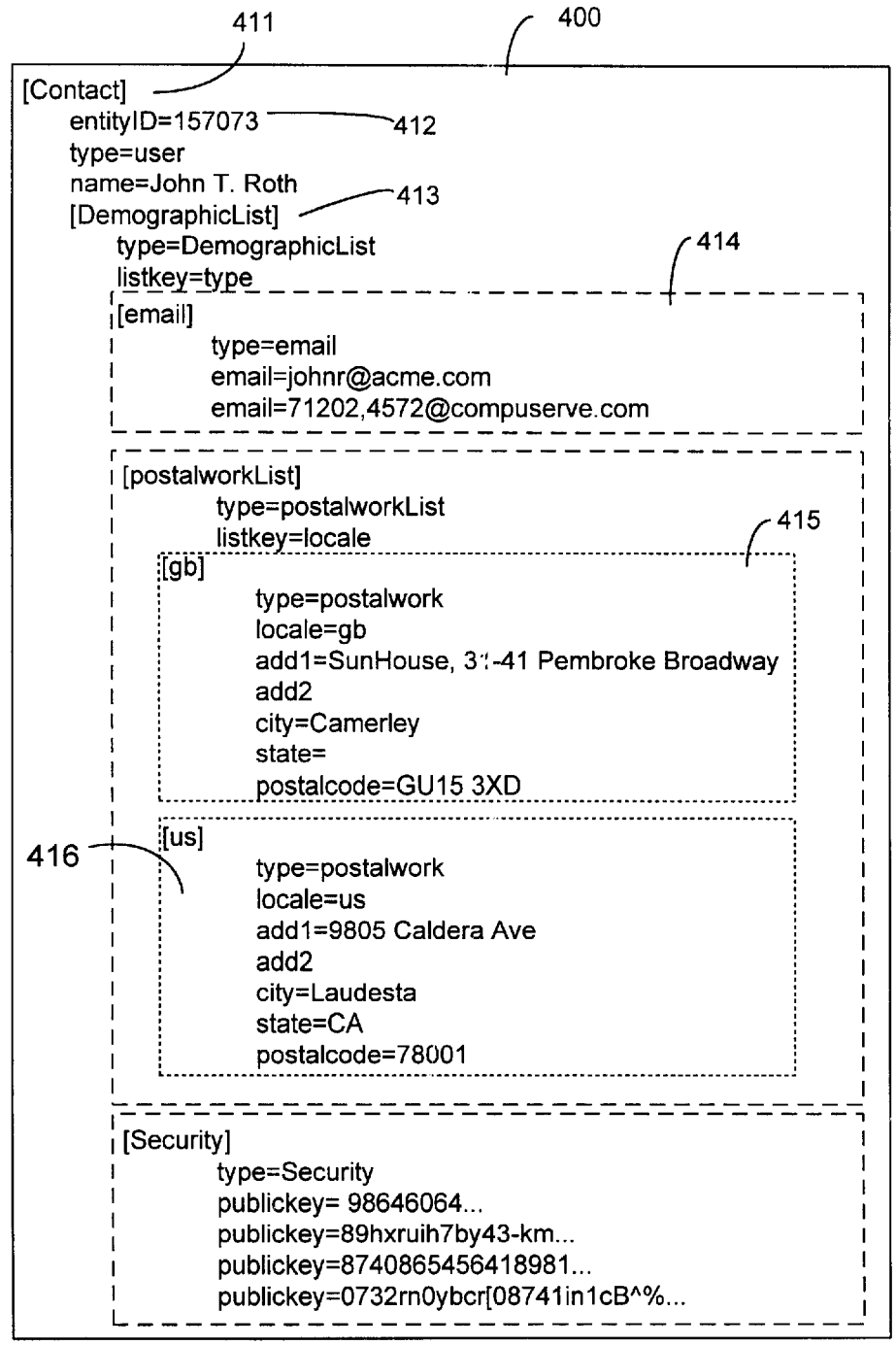
FIG. 4 shows an exemplary data structure for holding profile objects in accordance with the present invention.

As used herein, a "profile" is a data object containing a set of key/value pairs, such as profile 400 shown in FIG. 4. Each key/value pair is referred to as an "attribute" such as attribute 412 in FIG. 4. The value associated with a given key may be either a primitive value (e.g., a numeric value, string value, logical value, and the like) or may be another profile. When the value is another profile the value is referred to as a "subprofile". An individual profile in data structure 400 comprises 0 to n attributes and 0 to n subprofile bindings 402 where "In" is an arbitrary value selected to meet the needs of a particular application. In the example of FIG. 4, profile names are enclosed by brackets [ ] and attributes are represented as key=value pairs.

All profiles contain a type attribute. When the value of an attribute is a subprofile, the key is the type of the subprofile. In the case when the value is a subprofile the key/value pair is called a "binding". By binding several profiles it is possible to build hierarchical trees of information. It is possible to bind a profile to multiple parent profiles which is referred to herein as "linking". Linking enables the representation of relational information in addition to hierarchical information.

Profiles are not restricted in type as defined by the profile's attribute key or number of attributes that may be stored in a single profile. Moreover, individual attributes may have multiple values set as illustrated by the publickey attribute in the Security profile in FIG. 4. However, each binding has only a single value, although each profile may contain any number of bindings. Moreover, a bound subprofile may itself contain other subprofile bindings enabling a hierarchical structure.

Optionally, a schema may be associated with a profile data structure 400. A user may define a schema that forces profiles of specified types to contain at least a minimum set of attributes upon creation. A schema aids in providing uniformity and a minimal level of compatibility without limiting the dynamic and extensible nature of the profiles in accordance with the present invention. In the specific examples, conformance with a defined schema is only enforced when a profile is created. Hence, subsequent profile modifications may bring a profile out of compliance with the schema. In other words, the concept of a schema is loosely imposed on the profiles in the specific embodiment in favor of giving the user a greater freedom to manipulate, modify, and extend a schema after it is created.

As used herein, the term "object" refers to a data structure stored in mass storage or memory accessible by a computer that contains specified data and a set of methods or operations that enable the object to perform operations on the data it contains. The methods contained in an object also implement an interface enabling the object to receive data from and send data to other computer program devices. Data structure 400 is a representation of a profile object. It should be understood that the physical implementation of data structure 400 may vary significantly from application-to-application and may be implemented as a contiguous segment of storage locations or a dispersed arrangement of physical locations that are logically ordered in a manner shown in FIG. 4.

In general, when a profile is created it must be the "child" of some other profile, or it must be an "entity profile". In FIG. 4, profile 411 labeled "Contact" is an example of entity profile. An entity profile is a special subclass of a profile object that has an additional fixed attribute 412 called an entityID. The profile service in accordance with the present invention provides facilities for generating the entityID in a manner such that all entity profiles of the same type have unique entityIDs. Essentially, entity profiles serve a special role of establishing roots from which other profiles may be attached. Entity profiles support all of the operations of a profile, but add in addition support for some specialized method for accessing the ID attribute.

Entity profiles are used to represent data that has no single child relationship to another profile, or when no other profile exists. Entity profiles are useful to represent users, contacts, resources, components, groups, and the like. All of these entities have a discreet and meaningful independent existence and role in the real world. In contrast, conventional profiles (i.e., nonentity profiles) must always be attached as a child to either an entity profile or another nonentity profile. Nonentity profiles are useful for representing data such as display preferences, demographic information, identification information, and the like. All of these groups of information are meaningless unless related to some stand alone concept such as a user, resource, component, and the like.

In FIG. 4 the entity profile "Contact" includes a number of attributes including a subprofile binding "DemographicList". The profile DemographicList itself contains subprofile bindings to its list members "email", "postalworkList", and "Security".

DemographicList and PostalworkList in FIG. 4 are examples of another special profile type called a "profilelist". A profilelist relates multiple profiles of the same type to a single parent. This is done by binding a single profile list (e.g., postalworklist) to the parent (e.g., Contact) with multiple member profiles (e.g., "gb" and "us" in FIG. 4) are added to the list. While ProfileLists are serve to collect profiles of the same type, it is contemplated that they may also be used as a convenient collection object for subprofiles of different types. It is important to note that profilelist member profiles may not contain any attributes and do not support the concept of a schema. As a result of this limitation, several profile operations are not supported by ProfileLists.

FIG. 5A and FIG. 5B show simplified class diagrams indicating basic functional objects and characteristics of a profile service in accordance with the present invention. The profile service supports two basic functional objects, profiles themselves and a "profile manager". The profile manager interface is alternatively referred to as the profile service interface. The logical interfaces shown in FIG. 5A and FIG. 5B are not intended to be literal. Instead they are intended to articulate the fundamental functional operations that the service supports. All implementation of the profile service desirably support these classes of functions. In addition, individual implementations may support additional methods that are not supported in all implementations to meet the needs of a particular applications.

FIG. 5A and FIG. 5B list functions implemented in profile objects. All of the listed functions require the specification of a profile upon which the function will operate. The profile can be specified, for example, by passing context information from the requesting entity to the profile service in the request message. The profile class shown in FIG. 5A lists functions available in instances of profile objects. In general, this category of methods manipulate attributes within a specified profile. Hence, once a profile object is created it is autonomous in the sense that it can be directly accessed by user calls and it no longer relies on the profile manager (discussed in reference to FIG. 5B) to enable attribute manipulation.

In the exemplary implementation profile objects include meta-data associated with each attribute indicating such information as read/write/execute permissions, ownership, and the like. Meta-data is used by the profile service to for managerial purposes, but is not considered an explicit part of a profile as it is not normally provided in response to attribute access requests. Nevertheless, each profile includes meta-data manager methods for retrieval and modification of attribute values.

Schema methods within profile objects create and maintain a profile schema. A profile schema is created to enforce specified properties on all profile instances of a particular type. For example, consider a profile of type=employee. If no schema is defined, for each instance of the type= employee an independent profile is created in such a way that each profile can have a different set of attributes, subprofile bindings, and external data references. In contrast, when a schema is defined for a specified profile type, the schema specified a minimum set of attributes that must be included in the new profiles of that type and enforced upon new instances of that.

Subprofile binding methods are used to bind profiles to other profiles. Functions offered by the subprofile binding methods include method to list and retrieve existing bindings within a profile, as well as to create new bindings, revise existing bindings, and destroy existing bindings.

Profile objects also include search, template, and control methods as indicated in FIG. 5A. A search method accepts a user entity specified search expression, returns a list of subprofiles, or possibly attributes of a specified profile, that match the specified search expression. Template methods control the manner in which a given profile refreshes itself against a specified template to which it is attached. By attaching a profile to a template, changes in the template are reflected in the attached profile whenever the profile's refresh method is activated. Refresh can be performed on demand by the user entity, or automatically as specified in the template methods. Control methods include, for example, methods that define whether the profile can be extended by a user. As noted hereinbefore, a powerful feature of the present invention is that profiles can be dynamically extended by users. However, the present invention also provides a means by which this feature can be turned off.

Entity profile objects include variables, data and methods necessary to define basic functional interfaces of entity profiles described hereinbefore. In the specific example of FIG. 5A the entity profile class extends the profile interface (i.e., it supports all the methods found in the profile interface) by providing several method that are specific to entity profiles. The profile list class includes variables, data and methods necessary to define basic functional interfaces of profile lists described hereinbefore. The profile list class also extends the profile interface and provides additional methods used to look at and manipulate the contents of a profile list.

The profile manager object provides a mechanism for creating, retrieving and establishing schemas for profiles. Essentially, the methods summarized in FIG. 5B include factory methods that create new profiles (including entity profiles and profile lists), retrieve profiles, search profiles, define profile schema, and implement external data store methods. Search methods are substantially similar to the search methods used in profile objects, however, search all attributes within a specified profile rather than all attributes hierarchically below a specified profile.

To understand the power of these methods it is important to note that a user entity may be a human user, another software application, hardware device, or the like. The functions described above are representative only and it is contemplated that the profile, entity profile, profile list, and profile manager classes will implement a variety of other methods to meet the needs of a particular application. The specific methods and interfaces identified herein can be implemented in any available objected-oriented programming environment such as, for example, SmallTalk, C++, the JAVA platform, and the like. FIG. 6 shows an exemplary mechanism for accessing the built-in interface 305 (shown in FIG. 3) of a profile service instance in accordance with the present invention. In FIG. 6, the user entity is a client software application 601. The interface in accordance with the present invention is useful in a distributed, heterogeneous computing environment where the machine upon which profile service program 301 is running may be separate from client application 601. Moreover, profile service 301 may be running on a server using a first operating system such as Solaris™ operating system, Linux, WindowsNT, or the like. Client application 601 may be running on a personal computer, laptop computer or palm computer or the like executing another operating system such as Windows 98, Windows CE, or a JAVA run time environment, for example. JAVA and Solaris are trademarks or registered trademarks of Sun Microsystems, Inc. in the United States and other countries.

FIG. 6 shows an exemplary mechanism for accessing the built-in interface 305 (shown in FIG. 3) of a profile service instance in accordance with the present invention. In FIG. 6, the user entity is a client software application 601. The interface in accordance with the present invention is useful in a distributed, heterogeneous computing environment where the machine upon which profile service program 301 is running may be separate from client application 601. Moreover, profile service 301 may be running on a server using a first operating system such as Solaris™ operating system, Linux, WindowsNT, or the like. Client application 601 may be running on a personal computer, laptop computer or palm computer or the like executing another operating system such as Windows 98, Windows CE, or a Java run time environment, for example. Java and Solaris are trademarks or registered trademarks of Sun Microsystems, Inc. in the United States and other countries.

The implementation shown in FIG. 6 leverages the large installed base of hypertext transfer protocol (HTTP) transport layer devices that are ported to a wide variety of hardware and software applications. Client application 601 should include or have access to an HTTP transport protocol mechanism. The HTTP transport mechanism is widely used on the Internet for transporting hypertext documents such as hypertext markup language (HTML) and extensible markup language (XML) documents. Existing switches and routers in the physical communication network recognize HTML and XML documents, among other formats, encoded into an HTTP data packet. In this manner, the present invention requires little or no change in the user entities' configuration and physical transport network configuration.

In accordance with the present invention, a user entity such as client application 601 generates one or more request messages that access services provided by core profile engine 301. The request messages have a one-to-one correspondence with the profile manager methods and profile methods described hereinbefore. That is to say, for each method there is a corresponding request message used to access that method. The request message also includes argument data required by the method such as context information identifying the requesting user entity, providing authentication information, and the like.

In the preferred implementation the request messages is encapsulated in an XML document called a "request set". A request set is defined by an XML data type description (DTD). The request set DTD comprises a plurality of nested elements where at least one of the elements corresponds to a method in the profile manager or a profile itself. The element can include arguments required by the corresponding method.

As shown in FIG. 3, protocol adapter 304 implements the HTTP transport protocol to extract the request set from the HTTP data packet and reformats the request set document as a plurality of request messages. Profile services API 303 accepts the request messages and passes the messages to appropriate profile objects or the profile manager object for execution within core profile service engine 301. Typically a response message will be generated for each request message. Profile service API 303 receives the response messages and formats them into mark-up language documents called a "response set" document. Like the request set, a response set is defined by a data type definition and includes a plurality of nested elements at least some of which correspond to formatted response messages.

It will be appreciated that the profile service architecture described herein provides generic profiling capability accessible over conventional network facilities and readily integrated with a wide variety of software application in a manner that defines the fundamental behavior, representation, and functional interfaces for profile objects. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A mechanism for managing a plurality of profile data structures in a distributed computing environment, the mechanism comprising:
   a core profile service engine having a number of predefined built-in functions for creating, storing, instantiating, or manipulating profile data structures, each of the profile data structures comprising profile information for a user entity in the distributed computing environment;
   a first pluggable interface within the core profile service and supporting runtime binding to remote protocol adapters, the remote protocol adapters providing data transport mechanisms compatible with communication links between each of the user entities transmitting a request to the mechanism;
   a second pluggable interface within the core profiling service and supporting runtime binding to external datastore plug-ins; and
   a third pluggable interface within the core profiling service and supporting runtime binding to external service plug-ins, the external service plug-ins comprising functions for manipulating profile data structures.

2. The mechanism of claim 1 wherein the core profile service engine comprises a profile manager component and a plurality of profile objects.

3. The mechanism of claim 1 further comprising a first built-in interface built in to the core profile service supporting requests from remote user entities, the first built-in interface causing the core profile service engine to execute the built-in functions specified by the request.

4. The mechanism of claim 3 further comprising a second built-in interface within the core profile service supporting data exchange with a dedicated datastore.

5. The mechanism of claim 1 wherein the third pluggable interface comprises a naming and directory interface having a pluggable service provider interface supporting runtime bindings to a plurality of naming and directory service plug-ins.

6. The mechanism of claim 1 further comprising a plurality of datastore plug-ins coupled to the core profiling engine by a runtime binding to the second pluggable interface.

7. The mechanism of claim 1 further comprising a plurality of service module plug-ins coupled to the core profiling engine by a runtime binding to the third pluggable interface.

8. A method for operating a software application to manage a plurality of profile objects comprising the steps of:
   storing a plurality of profile objects for a plurality of user entities in a distributed computing environment in a datastore mechanism, each of the profile objects having a number of built-in functions;
   instantiating a core profile service mechanism having a number of predefined built-in functions, a first pluggable interface within the core profile service and supporting runtime binding to remote protocol adapters and a second pluggable interface within the core profiling service and supporting runtime binding to external datastore plug-ins;
   receiving a service request message from one of the user entities through the first pluggable interface;
   creating a runtime binding between the second pluggable interface and a naming and directory service plug-in selected based on the received service request;
   accessing the datastore mechanism using the second pluggable interface and the naming and directory service plug-in to retrieve the stored profile object for the requesting one of the user entities;
   instantiating the retrieved profile object;
   generating a response message using the predefined functions of the instantiated profile object; and
   sending the response message to an external user through the first pluggable interface.

9. The method of claim 8 further comprising the steps of:
   creating a runtime binding between the first pluggable interface and a specified remote protocol adapter where the remote protocol adapter is specified to be compatible with a protocol used by the external user.

10. The method of claim 8 further comprising:
    providing a third pluggable interface within the core profiling service; and
    establishing a runtime binding to an external service module plug-ins, the external service module plug-ins comprising functions for manipulating profile data structures.

11. The method of claim 10 further comprising creating a runtime binding between the third pluggable interface and a service provider plug-in, the service module plug-in, the service module plug-ins comprising functions for manipulating profile data structures.

12. The method of claim 8 wherein the step of instantiating further comprises:
    initiating a naming and directory interface coupled to the core profile service and
    creating a dedicated binding to the datastore mechanism through the directory and naming interface.

13. The method of claim 12 wherein the directory and naming service includes an integrated service provider interface (SPI).

14. A distributed profile service system for providing profile services to a number of user software applications, the profile service system comprising:
    a plurality of geographically distributed profile service instances;
    a dedicated datastore coupled to each profile service instance;
    a plurality of shared datastore mechanisms each including a replica of at least some data from the other dedicated datastore mechanisms;
    a first runtime binding mechanism in each profile service instance configured to establish a runtime binding to the user software applications, wherein at least a portion of the user software applications are geographically remote from the profile service instance;
    a second runtime binding mechanism in each profile service instance configured to establish a runtime binding to one of the shared datastore mechanisms; and
    a third runtime binding mechanism in each profile service instance configured to establish a runtime binding to a service module plug-in.

15. The profile system of claim 14 wherein the user software application comprises a domain-specific software application communicating with a client software application.

16. The profile system of claim 14 wherein each profile service instance includes a naming and directory interface coupled to access the dedicated datastore.

17. The profile service of claim 14 wherein each profile service instance includes mechanisms to forward service requests received by a first profile service instance to a second profile service instance.

18. A computer program product embodied in a tangible form comprising:
    computer program devices readable by a data processor coupled to receive the propagating signal for managing a profile data service, the computer program product comprising:
    first program code devices configured represent a plurality of profile objects, each of the profile objects including program code devices configured to cause a computer to perform a number of predefined built-in functions for creating, storing, instantiating, or manipulating profile data structures, each of the profile data structures comprising profile information for a user entity;
    a second program code device configured to cause a computer to instantiate a profile manager object, the profile manager object including program code devices expressing a number of predefined built-in functions;
    third program code devices configured to cause a data processor to implement a first pluggable interface supporting runtime binding to two or more differing remote protocol adapters, the remote protocol adapters providing data transport mechanisms compatible with communication links between each of the user entities transmitting a request to the mechanism;
    fourth program code devices configured to cause a computer to implement a second pluggable interface supporting runtime binding to external datastore plug-ins; and
    fifth program code devices configured to cause a computer to implement a third pluggable interface supporting runtime binding to external service module plug-ins.

19. The computer program product of claim 18 further comprising:
    sixth program code devices configured to make a runtime binding with the third program code devices and cause the computer to communicate service request messages through the first pluggable interface to the first and second program code devices.

20. The computer program product of claim 18 further comprising:
    sixth program code devices configured to make a runtime binding with the fourth program code devices and to cause a computer to provide naming and directory services with an external data store according to a protocol described by the sixth program code devices.

21. The computer program product of claim 18 further comprising:
    sixth program code devices configured to make a runtime binding with the fifth program code devices and cause a computer to provide a number of predefined functions in addition to the functions provided by the first and second program code devices.

22. The computer program product of claim 18 wherein the tangible form comprises a magnetic disk.

23. The computer program product of claim 18 wherein the tangible form comprises an optical disk.

24. The computer program product of claim 18 wherein the tangible form comprises a propagating signal.

25. The computer program product of claim 18 wherein the tangible form comprises a random access memory device.

26. A mechanism for managing a plurality of profile objects comprising:
    means for storing a plurality of profile objects for a plurality of user entities in a datastore mechanism, wherein each of the profile objects having a number of built-in functions and the datastore mechanism comprises a virtual profile data store comprising a plurality of data storage devices;
    means for instantiating a core profile service mechanism having a number of predefined built-in functions, a first pluggable interface within the core profile service and supporting runtime binding to remote protocol adapters and a second pluggable interface within the core profiling service and supporting runtime binding to external datastore plug-ins;
    means for receiving a service request message from one of the user entities through the first pluggable interface;
    means for creating a runtime binding between the second pluggable interface and a naming and directory service plug-in selected based on the received service request;
    means for accessing the datastore mechanism using the second pluggable interface and the naming and directory service plug-in to retrieve the stored profile object for the requesting on e of the user entities;
    means for instantiating the retrieved profile object;
    means for generating a response message using the predefined functions of the instantiated profile object; and
    means for sending the response mess age to an external user through the first pluggable interface.

27. The mechanism of claim 1, wherein the requesting user entities use at least two differing data transport protocols to access the mechanism on the communication links.

28. The mechanism of claim 1, wherein the profile information comprises information used by hardware, software, or an operating system on a network device corresponding to the remote user entity to configure, to initialize, to shutdown, or to make runtime processing decisions.

29. The mechanism of claim 4, wherein the core profile service engine responds to the requests from the user entities by accessing the profile information for each of the requesting user entities from the dedicated datastore via the second built-in interface and generating a response based on the accessed profile information that is transmitted to the particular requesting user entity via the remote protocol adapter corresponding to the particular requesting user entity.

30. The method of claim 8, wherein the response message comprises profile information for the requesting one of the user entities comprising information used by hardware, software, or an operating system associated with the one of the user entities to configure, to initialize, to shutdown, or to make runtime processing decisions.

31. The method of claim 8, wherein the datastore mechanism comprises a virtual profile data store comprising a plurality of heterogeneous data storage devices and further wherein the naming and directory service plug-in is selected from a set of plug-ins compatible with the heterogeneous data storage devices.

32. The mechanism of claim 26, wherein the response message comprises profile information for the requesting one of the user entities comprising information used by hardware, software, or an operating system associated with the one of the user entities to configure, to initialize, to shutdown, or to make runtime processing decisions.

33. The mechanism of claim 26, wherein the data storage devices of the virtual profile data store are heterogeneous data storage devices and further wherein the naming and directory service plug-in is selected from a set of plug-ins compatible with the heterogeneous data storage devices.

* * * * *

UNITED STATES PATENT AND TRADEMARK OFFICE
CERTIFICATE OF CORRECTION

PATENT NO. : 6,757,720 B1  Page 1 of 1
DATED : June 29, 2004
INVENTOR(S) : Paul W. Weschler, Jr.

It is certified that error appears in the above-identified patent and that said Letters Patent is hereby corrected as shown below:

Title page,
Item [57], ABSTRACT,
Line 7, "adapterso" should be -- adapters --

Column 20,
Line 24, "on e" should be -- one --
Line 28, "mess age" should be -- message --

Signed and Sealed this

Fourteenth Day of September, 2004

JON W. DUDAS
*Director of the United States Patent and Trademark Office*